United States Patent [19]

Nosu et al.

[11] Patent Number: 5,120,783

[45] Date of Patent: Jun. 9, 1992

[54] STABILIZED HALOGEN-CONTAINING RESIN COMPOSITIONS

[75] Inventors: Tsutomu Nosu; Shigeo Miyata, both of Takamatsu, Japan

[73] Assignee: Kyowa Chemical Industry Co., Ltd., Kagawa, Japan

[21] Appl. No.: 613,989

[22] Filed: Nov. 15, 1990

[30] Foreign Application Priority Data

Nov. 16, 1989 [JP] Japan .................. 1-296126

[51] Int. Cl.⁵ .................. C08K 5/526; C08K 5/07
[52] U.S. Cl. .................. 524/357; 524/147; 524/151; 524/351; 524/424; 524/432; 524/434; 524/436
[58] Field of Search ............ 524/424, 432, 434, 351, 524/436, 357, 437, 147, 151

[56] References Cited

U.S. PATENT DOCUMENTS

| | | | |
|---|---|---|---|
| 4,085,088 | 4/1978 | Miyata et al. | 524/156 |
| 4,102,839 | 7/1978 | Crochemore et al. | 524/357 |
| 4,427,816 | 1/1984 | Aoki et al. | 524/424 |
| 4,675,356 | 6/1987 | Miyata | 524/434 |
| 4,751,261 | 6/1988 | Miyata et al. | 524/436 |

FOREIGN PATENT DOCUMENTS 0256872  2/1988  European Pat. Off.
0362012  4/1990  European Pat. Off.

*Primary Examiner*—Veronica P. Hoke
*Attorney, Agent, or Firm*—Wenderoth, Lind & Ponack

[57] ABSTRACT

A stabilized halogen-containing resin composition wherein
 (a) 0.01 to 10 weight parts of da hydrotalcite,
 (b) 0.01 to 5 weight parts of a zinc compound,
 (c) 0.01 to 5 weight parts of magnesium hydroxide, and
 (d) 0.01 to 5 weight parts of a $\beta$-diketone compound and/or a phosphite compound
are compound into a halogen-containing resin per 100 weight parts thereof and a molding article therefrom.

7 Claims, No Drawings

STABILIZED HALOGEN-CONTAINING RESIN COMPOSITIONS

DETAILED DESCRIPTION OF THE INVENTION

1. Industrially Applicable Field

This invention relates to a stabilized halogen-containing resin composition. More detailedly, this invention relates to a halogen-containing resin composition having restrained initial coloring, high transparency and excellent heat stability, wherein (a) a hydrotalcite, (b) a zinc compound, (c) magnesium hydroxide, and (d) a $\beta$-diketone compound and/or a phosphite compound are compounded into a halogen-containing resin.

2. Prior Art

Halogen-containing resins are unstable against light, and especially when heat melt molding is carried out, decomposition takes place accompanied by generation of hydrogen halide. As a result, the arise disadvantages, for example, that the resin is colored or its mechanical strength lowers. For solution of such disadvantages, a compound of a metal such as Cd, Sn, Pb, Ca, Ba or Zn has necessarily been added as a stabilizer to the halogen-containing resin before the thermal molding and processing, and thus the purpose has been attained.

However, recently, the toxicity of compounds of Cd, Pb and Ba has come to become a social problem, and particularly, use of compounds of Cd and Pb either has almost been prohibited, or is only permitted in extremely limited fields. Further, also as for compounds of Sn, their addition quantities are restricted in view of toxicity, and further they have a drawback of being expensive.

Compounds of Ca and Zn have advantages of extremely low toxicity and cheapness, but have, when compounded into a halogen-containing resin, disadvantage that only a small extent of improvement effects of transparency and heat stability are obtained.

On the other hand, when, as proposed by one of the present inventors, a stabilizer containing as a main component a hydrotalcite is added to the resin (refer to U.S. Pat. No. 4,085,088), the resulting resin composition has only very small toxicity, and further are excellent in transparency and heat stability. Therefore, the technique has drawn attention in many use fields, and their use has enlarged.

However, hydrotalcites have a drawback that, when added to halogen-containing resins, they color the resins to red group color. It was proposed as an improvement method of this coloring to compound into a hydrotalcite a combination of zinc and a $\beta$-diketone compound (refer to U.S. Pat. No. 4,427,816). According to this proposal, the initial coloring of the halogen-containing resin was improved. In this proposal, when a hydrotalcite is used after being heated to about 200° to 300° C. to remove crystallization water, there arises effects that the initial coloring is reduced, and moreover, when the resin composition is molded and processed at a temperature of 200° C. or more, the trouble of foaming is reduced or obviated.

3. Problems to be solved by the Invention

However, the improvement in the above U.S. Patent caused another problem that the excellent heat stability is somewhat reduced which the resin composition inherently possessed when a hydrotalcite was compounded therein. This reduce in heat stability tends to occur particularly strikingly when the above hydrotalcite after the crystallization water removal treatment is used. This tendency becomes greater in proportion as the addition amount of the zinc compound effective to reduce the initial coloring increases. On the other hand, the $\beta$-diketone compound used together with zinc compound is expensive. Thus, it is desirable to increase the addition amount of the cheap zinc compound and use the expensive $\beta$-diketone compound at an as small amount as possible.

Means for Solving the Problems

The present inventors studied for the purpose of improving the lowering of heat stability inherently possessed by a hydrotalcite which lowering occurs when a zinc compound and a $\beta$-diketone compound are used together in order to solve the drawback of the initial coloring when the hydrotalcite, particularly the hydrotalcite after being subjected to the treatment of removal of crystallization water with heating is incorporated as a stabilizer in a halogen-containing resin. As a result, they found that the above purpose can be attained by further compounding microcrystalline and highly dispersible magnesium hydroxide. It was found that, by compounding of such magnesium hydroxide, the lowering of heat stability as the problem can remarkably be improved with hardly impairing the advantage of non-toxicity and transparency inherently possessed by the hydrotalcite and with hardly having a bad influence on the prevention of initial coloring by the zinc compound and the $\beta$-diketone compound.

In addition, it was found the phosphite compounds have the same action with $\beta$-diketone compounds.

Thus, according to this invention, a stabilized halogen-containing resin composition is provided wherein (a) 0.01 to 10 weight parts of a hydrotalcite,
(b) 0.01 to 5 weight parts of zinc compound,
(c) 0.01 to 5 weight parts of magnesium hydroxide, and
(d) 0.01 to 5 weight parts of a $\beta$-diketone compound and/or a phophite compound are compounded into a halogen-containing resin per 100 weight parts thereof.

Such halogen-containing resin compositions of the invention have the characteristic and advantage that they can be utilized over extremely wide fields from fields of medical applicances, food packing, food vessels, etc. where stability of an extremely high level is required to fields of automobile parts, miscellaneous goods, etc. where non-toxicity is not so required.

Furthermore, halogen-containing resin compositions of the invention exhibit only a low extent of initial coloring and are excellent in transparency and heat stability. Therfore, halogen-containing resin compositions of the invention are particularly excellent as materials of medical appliances, food vessels, food packing, film, cosmetic vessels, etc.

The halogen-containing resins in resin compositions of the invention include homopolymers on copolymers of a halogen-containing monomer, halides of a polymer, etc. Examples of such halogen-containing resins include vinyl chloride polymers, vinyl chloride/vinyl acetate copolymers, vinylidene chloride polymers or copolymers, post-chlorinated vinyl chloride polymers, chlorinate olefin polymers such as chlorinated polyethylene and chlorinated polypropylene, and the like.

The hydrotalcite (a) compounded in the above halogen-containing resin composition in the invention is a hydrotalcite represented by the following formula (1)

$$M_{1-x}{}^{+2}Al_x(OH)_2A_{x/n}{}^{n-}\cdot mH_2O \tag{1}$$

(wherein $M^{+2}$ is Mg or a mixture of Mg and Zn, $A^{n-}$ represents one or more of n valent anions, x is a positive number satisfying $0<X<0.5$, and m is a positive number satisfying $0 \leq m \leq 1$) or a compound having an analogous crystal structure thereto.

In the hydrotalcite of the above general formula, $ClO_4{}^-$, $CH_3COO^-$, $CO_3{}^{2-}$ or the like is mentioned as the n valent anion of $A^{n-}$. Further, it is preferred that x is a positive number satisfying $0.2 \leq x \leq 0.5$, particularly $0.3 \leq x \leq 0.4$.

It is preferred that the hydrotalcite of the above formula to be used is one whose crystallization water was almost removed by heating at a temperature of about 200° to 300° C. for about several hours to ten and several hours for the purpose of the desired further reduction of the initial coloring and realization of transparency as well as for the purpose of preventing foaming at the time of processing and molding at about 200° C. or more. That is, the hydrotalcite whose crystalization water was removed corresponds to the hydrotalcite of the above formula wherein m is 0.

It is preferred that a hydrotalcite to be used in the invention is one wherein crystals are developed relatively well and which exhibits only a low extent of aggregation. The BET specific surface area as a representative indicating the size of crystals is preferably in the range of about 10 to 30 m²/g, and the secondary grain size is suitably about 2 μm or less, preferably 1 μm or less.

Suitable hydrotalcites used in the invention are, for example, hydrotalcites disclosed in the specifications of U.S. Pat. Nos. 3,539,306, 3,650,704, 3,796,792, 3,875,525, 3,879,523 and 4,085,088 and those obtained according to the preparation processes therein.

On the other hand, in order to improve the dispersibility of the hydrotalcite in the resin, it is preferred to previously cover its crystal surface with an anion surfactant, a silane coupling agent, a titanate coupling agent, an aluminum coupling agent, an acid phosphite or the like. The compounding amount of the above hydrotalcite is 0.01 to 10 weight parts, preferably 0.1 to 5 weight parts, particularly preferably 0.2 to 2 weight parts per 100 weight parts of the halogen-containing resin.

Zinc salts of the following organic acids are preferably used as the zinc compounds (b) in the invention. Specific examples of organic acids forming zinc salts include monovalent carboxylic acids having 2 to 40 carbon atoms such as acetic acid, propionic acid, butyric acid, valeric acid, caproic acid, enanthic acid, caprylic acid, neodecanoic acid, 2-ethylhexanoic acid, pelargonic acid, carpryl acid, undecanoic acid, lauric acid, tridecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-tert-butylbenozic acid, dimethylhydroxybenzoic acid, 3,5-di-tert-butyl-4-hydroxybenzoic acid, toluic acid, dimethylbenzoic acid, ethylbenzoic acid, cuminic acid, n-propylenzoic acid, aminobenzoic acid, N,N-dimethylbenzoic acid, acetoxybenozic acid, salicylbenzoic acid, p-tert-octylsalicylic acid, oleic acid, elaidic acid, linoleic acid, linolenic acid, thioglycolic acid, mercaptopropionic acid and octylmercaptopropionic acid; monoester or monoamide compounds of divalent carboxylic acids having 2 to 40 carbon atoms such as oxalic acid, malonic acid, succinic acid, glutaric acid, adipic acid, pimelic acid, suberic acid, azelaic acid, sebacic acid, phthalic acid, isophthalic acid, tetraphthalic acid, oxyphthalic acid, chlorophthalic acid, aminophthalic acid, maleic acid, fumaric acid, citraconic acid, metaconic acid, itaconic acid, aconitic acid and thiodipropionic acid; di- or triester compounds of trivalent or tetravelent carboxylic acids having 5 to 40 carbon atoms such as hemimellitic acid, trimellitic acid, mellophanic acid, pyromellitic acid and mellitic acid; etc. Besides the above organic acid salts of zinc, inorganic zinc compounds such as zinc oxide, basic zinc carbonate and zinc carbonate can also be used.

The use amount of such a zinc compound (b) is 0.01 to 5 weight parts, preferably 0.05 to 1 weight parts, particularly preferably 0. to 0.5 weight part per 100 weight parts of the halogen containing resin.

It is desired for improvement of heat stability and transparency that magnesium hydroxide (c) used in the invention is a composed of small crystals and their secondary grains are small. Crystal size represented in terms of BET specific surface area is 15 m²/g or more, particularly preferably 2 m²/g or more. The average secondary grain size is 2 μm or less, preferably 1 μm or less and particularly preferably 0.5 μm or less. It is preferred, in order to improve the dispersibility of magnesium hydroxide in the resin, to use a surface treating agent of the hydrotalcite similarly.

Compounding amount of the above magnesium hdyroxide (c) is 0.01 to 5 weight parts, prefeably 0.05 to 1 weight part and particularly preferably 0.1 to 0.5 weight part per 100 weight parts of the halogen-containing resin.

β-Diketone compounds (d) used in the invention are compound represented by the following formula (2)

$$R_1-CO-CHR_2-CO-R_3 \tag{2}$$

wherein $R_1$ and $R_3$ may be the same or different and each represent a straight-chain or branched alkyl or alkenyl group having up to 30 carbon atoms, an alkyl group having 7 to 36 carbon atoms, or an aryl or alicyclic group having less than 14 carbon atoms (the alicyclic group can optionally contain carbon-carbon double bond(s), and one of the two may be a hydrogen atom), and $R_2$ represents a hydrogen atom, or an alkyl or alkenyl having up to 30 carbon atoms.

Specific examples of such β-diektone compounds (d) include, for example, dehydroacetic acid, dehydropropionylacetic acid, dehydrobenzoylacetic acid, cyclohexane-1,3-dione, dimedone, 2,2'-methylenebiscyclohexane-1,3-dione, 2-benzylcyclohexane-1,3-dione, acetyltetralone, palmitoyltetralone, stearoyltetralone, benzoyltetralone, 2-acetylcyclohexanone, 2-benzoylcyclohexanone, 2-acetyl-cyclohexanone- 1,3-dione, benzoyl-p-chlorobenzolymethane, bis(4-methylbenzoyl)methane, bis(2-hydroxybenzoyl)methane, benzoylacetylmethane, tribenzoylmethane, diacetylbenzoylmethane, stearoylbenzoylmethane, palmitoyl-benzoylmethane, dibenzoylmethane, 4-methoxybenzoly-benzoylmethane, bis(4-chlorobenzoyl)methane, bis(3,4-methylenedioxybenzol)methane, benzoyl-acetyl-octylmethane, benzoyl-acetyl-phenylmethane, stearoyl-4-methoxybenzoylmethane, bis(4-t-butylbenzoyl)methane, benzoylacetyl-ethymethane, benzoyl-trifluoro-acetylmethane, diacetylmethane, butanoyl-acetylmethane, heptanoyl-acetylmethane, triacetylmethane, distearoylmethane, stearoyl- acetylmethane, palmitoyl-acetylmethane, lauroyl-acetylmethane, benzoyl-formylmethane, acetylformyl-methylmethane, benzoyl-phenylacetylmethane, bis(cyclohexanoyl)methane, etc. Further, metal salts of these β-diketone compounds, for example, salts thereof with metals such as lithium, sodium, potassim, magnesium, calcium, barium, zinc, zirconium, tin and aliuminum can similarly be used.

Particulrly preferred among the aobve β-diketone compounds (d) are stearoyl-benzolymethane and dibenzoylmethane.

The phosphite compounds (d) used in the invention is a compound (monophosphite) represented by the following formula (3)

(wherein $R_4$, $R_5$ and $R_6$ are the same or different with one another and each represent an alkyl group having 1 to 20 carbon atoms or an aryl group having 6 to 14 carbonatoms), a compound of the formula (3) wherein two of the substituents form a ring, or a compound of an oligomer structure (oligophosphite) wherein substituents of plural molecules of the formula (3) are mutually intermolecularly linked.

Specific examples of phosphite compounds (d) include, for example, triarylphosphites such as triphenyl phosphite, tris(nonylphenyl) phosphite, tris(o-cyclohexylphenyl) phosphite, tris(p-nonylphenyl) phosphite, mononorylphenyl dinonylphenyl phosphite, phenyl p-nonylphenyl phosphite and tris(2,4-di-t-butylphenyl) phosphite; alkyl aryl phosphites such as isooctyl diphenyl phospite isodecyl diphenyl phosphite lauryl diphenyl phosphite, phenyl diisodecyl phosphite and phenyl dilauryl phosphite; trialkyl phosphites such as triisooctyl phosphite, triisodecyl phosphite, trilauryl phosphite and trioleyl phosphite; oligophosphites such as bisphenol A tetra $C_{12-15}$ alkyl diphosphite (trade name: "MARK 1500"), distearyl pentaerythritol diphosphite, 2-t-butyl-2-(3-t-butyl-4-hydroxyphenyl) p-cumenylbis(p-nonylphenyl) phosphite, diisodecyl pentaerithritol diphosphite and dinonyl phenyl pentaerythritol diphosphite; etc.

Preferred among the above phosphite compounds (d) are bisphenol A tetra $C_{12-15}$ alkyl diphosphite, triisodecyl phosphite and phenyl diisodecyl phosphite, and particularly preferred is bisphenol A tetra $C_{12-15}$ alkyl diphosphite.

The above β-diketone compound and/or phosphite compound are/is compounded in the rate of 0.01 to 5 weight parts, preferably 0.05 to 1 weight part per 100 weight parts of the halogen-containing resin.

The halogen-containing resin composition of the invention may further contain, besides the aforementioned components (a) to (d), other components usually used as additives for resins, particularly halogen-containing resins. These other additives include, for example, a heat stabilizer, a plasticizer, an antioxidant, an ultraviolet absorber, an antistatic agent, a lubricant, a coloring agent, an impact improver, etc. Specific example of these additives are described below.

(1) Heat stabilizers

There can, for example, be mentioned metallic soap heat stabilizers such as metallic soaps of Ca, Mg or Ba with an aliphatic acid such as 2-ethylhexoinic acid, lauric acid, myristic acid, palmitic acid, stearic acid, hydroxystearic acid, linolic acid, behenic acid, isostearic acid, oleic acid or ricinoleic acid; composite metallic soap heat stabilziers such as composite metallic soaps of Ca/Zn or Ba/Zn with one of the above aliphatic acids; epoxy compound heat stabilziers such as epoxidized soybean oil, epoxidized linseed oil aliphatic acid butyl, epoxidized linseed oil, epoxidized 1,2-polybutadiene, bisphenol 4-diglycidyl ether, 3,4-epoxycyclhexylmethyl and 3,4-epoxycyclohexanecarboxylate; polyol heat stabilziers such as pentaerythritol, mannitol, xylitol, sorbitol, glycerol, trimethylolpropane, polyethylane glycol, polyvinyl alcohol and sorbitan monolaurate; aminocarboxylic acid heat stabilizers such as butanediol β-aminocrotonic acid ester, N-acetylglutamine acid and N-acetylmethionine; sulfur compound-containing heat stabilizers such as dilauryl-thiodipropionate and 6-anilino-1,3,5-triazine-2,4-dithiol; organic antimony heat stabilizers such as dibutylantimonymercapto type, dibutylantimony laurate type, dibutylantimony maleate type, di-n-octyl-antimonymercapto type, di-n-octylantimony maleate type and di-n-octylantimony laurate type oraganic antimonies; nitrogen-containig heat stabilizers such as urea, melamine, α-phenylindole, diphenylthoiurea and tris(2-p-hydroxyethyl) isocyanurate; etc.

(2) Plasticizers

There can, for example, be mentioned phosphoricacid ester plasticizers such as tributyl phosphate, triphenyl phosphate and tris(2-ethylphexyl) phosphate; phthalic acid ester plasticizers such as dimethyl phthalate, dibutyl phthalate, dioctyl phthalate and diisodecyl phthalate; aliphatic monobasic acid ester plasticizers such butyl oleate, glycerol monooleic acid ester, butyl stearate and butyl epoxystearate; aliphatic dibasic acid ester plasticizers such as diisodecyl adipate, dibutyl adipate and di-2-ethylphexyl adipate; dihydric alcohol ester plasticizers such as diethylene glycol benzoate; oxyacid ester plasticizers such as methyl acetyl ricinoleate; chlorinated paraffin plasticizers; wax plasticizers such as waxes, low molecular weight polystyrenes and liquid paraffin; etc.

(3) Antioxidants

There can, for example, be mentioned 2,6-di-tert-butyl-p-cresol, 2,5-di-tert-butylhydroquinone, 2,2'-methylene-bis(4-methyl-6-tert-butylphenol), tetrakis(2,4-di-tert-butylphenyl), 4,4'-bisphenylenediphophonite, 4,4'-thiobis-(6-tert-butylphenol), 4,4'-thiobis-(6-tertbutyl-m-cresol), octadecyl-3-(3',5'-di-tert-butyl-4'-hydroxyphenol) propionate. etc.

(4) Ultraviolet absorbers

There can, for example, be mentioned 2-hydroxy-4-octoxybenzophenone, 2-(2'-hydroxy-5-methylphenyl)-benzotriazole, ethyl 2-cyano-3,3-diphenylacrylate, etc.

(5) Antistatic agents

There can, for example, be mentioned polyethylene oxide, carbowaxes, pentaerithritol monostearate, sorbitan monopalmitate, sulfated oleic acid, etc.

(6) Lubricants

There can, for example, be mentioned calcium stearate, zinc stearate, butyl stearate, polyethylene wax, palmitamide, stearyl alcohol, ethylenebisstearamide, glycerol trimontanate, glycerol hydroxystearate, etc.

(7) Coloring agents

There can, for example, be mentioned various kinds of dyeing lakes, synthetic dyes, inorganic pigments, etc.

(8) Impact property improver

There can, for example, be metnioned MBS (methyl methacrylate-butadiene-styrene), ABS, acrylic polymers fibrous magnesium hydroxide, etc.

Compounding amounts of these additives (1) to (8) can appropriately be selected, and, for example, there can be compounded in 100 weight parts of the halogen-containing resin 0.01 to 10 weight parts of a heat stabilizer, 1 to 70 weight parts of a plasticizer, 0.01 to 2 weight parts of an antioxidant, 0.01 to 3 weight parts of an ultraviolet abosrber, 0.01 to 2 weight parts of an antistatic agent, 0.1 to 5 weight parts of a lubricant, 0.1 to 2 weight parts of colorant and 1 to 20 weight parts of an impact property improver.

There is no special restriction about the method and means to compound components (a) to (d) and, if desired, various additives in the halogen-containing resin in preparation of the resin composition of the invention, and any method and means can be adopted as long as respective components are uniformly compounded in the resin thereby. For example, conventional means can be used such as a ribbon blender high speed mixer, kneader, pleetizer or extruder.

In the invention, the BET specific surface and the secondary gain size means values measured by the following measurement methods, respectively.

BET specifi surface area

BET specific surface area was determined by the three point plotting method according to the nitrogen adsorption method, provided that the molecular adsorption area of $N_2$ was calculated as $(16,2 Å^2)$. Further, each measurement sample was first subjected to deaeration treatment in vacuo at 100° C. for 30 minutes, and then measured for adsorption isotherm of nitrogen.

Secondray grain size 0.7 g of a sample is placed in a 100 ml beaker, and 70 ml of deionized water is gradually added thereto to carry out sufficient dispersion. Dispersion treatment is carried out 3 minutes using an ultrasonic homogenizer. Immediately thereafter part thereof is taken, and measured using a microtrack grain size analyzer produced by LEEDS & NORTHROP INSTRUMENTS Company.

EXAMPLE

This invention is more detailedly described according to the following examples.

EXAMPLES 1 TO 5

Polyvinyl chloride and other additives in the compounding ratio indicated below were uniformly mixed with a Henschel mixer, and melted and kneaded at 200° C. using a monoaxial extruder. The kneaded materials were press molded into a sheet 3 mm thick at 200° C. and a pressure of 200 kg/cm² for 5 munites using a press molder, and test pieces were prepared therefrom.

| Compounding | |
|---|---|
| polyvinyl chloride (average polymerization degree 1000) | 100 weight parts |
| Hydrotalcite | 0.1 weight parts |
| Zinc stearate (Zinc compound) | 0.2 weight parts |
| Stearoyl-benzoylmethane ($\beta$-diketone) | 0.2 weight parts |
| MBS (impact strength improver) | 4.0 weight parts |
| Epoxidized soybean oil | 2.0 weight parts |
| Lubricant | 2.0 weight parts |
| Processing auxiliary | 1.0 weight parts |
| Magnesium hydroxide | varied amount |

The hydrotalcite had the following composition

$Mg_{0.50}Zn_{0.16}Al_{0.34}(OH)_2(CO_3)_{0.17}.0.05H_2O$, and in advance of use, was surface treated with 1 weight % stearic acid and then heat treated at 240° C. for 4 hours.

The magnesium hydroxide used was one which had been surface treated with 1 weight % oleic acid and had BET specific surface area and average secondary grain size shown in Table 1.

Each test piece was measured for initial coloring property by visual observation, transparency by entire light beam transmittance, and heat stability time as the time costed for the test piece to blacken in an oven of 210° C. These results are shown in Table 1.

COMPARATIVE EXAMPLES 1 TO 3

The same manipulation as in Example 1 was made except that magnesium hydroxide, which has the BET specific surface area and average secondary grain size shown in Table 1 and surface treated with 1 weight % oleic acid as in the case of Example 1, was used as magnesium hydroxide. The results are shown in Table 1.

COMPARATIVE EXAMPLE 4

The same manipulation as in Example 1 was made exept that magnesium hydroxide was not compounded. The results are shown in Table 1.

EXAMPLE 6

The same manipulation as in Example 1 was made except that, in place of stearoyl-benzolymethane ($\beta$-diketone), the same amount of bisphenol A tetra $C_{12-15}$ alkyl diphosphite (MARK 1500 produced by ADEKA ARGUS Co.) was used. The results are shown in Table 1.

EXAMPLE 7

The same manipulation as in Example 1 was made except that as a hydrotalcite was used one which has the following composition.

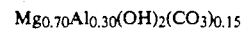

$Mg_{0.70}Al_{0.30}(OH)_2(CO_3)_{0.15}$ was used one which has the following composition.

$Mg_{0.60}Zn_{0.10}Al_{0.30}(OH)_2(CO_3)_{0.15}.0.55H_2O$, and was surface treated with 1 weight % lauric acid. The results are shown in Table 1.

EXAMPLE 9

The same manipulation as in Example 6 was made except that, in place of bisphenol A $C_{12-15}$ alkyl diphosphite, the same amount of phenyl diisodecyl phosphite was used. The results are shown in Table 1.

into a halogen-containing resin per 100 weight parts thereof.

TABLE 1

| Number | Magnesium hydroxide | | | Physical properties of test piece | | |
|---|---|---|---|---|---|---|
| | BET specific surface area (m2/g) | Average secondary grain size (μm) | Compounding amount (weight part) | Initial coloring property | Transparency (Entire light beam transmittance) (%) | Heat stability (min.) |
| Example 1 | 25 | 0.3 | 0.1 | no coloring | 78 | 25 |
| 2 | " | " | 0.2 | " | 74 | 30 |
| 3 | " | " | 0.5 | " | 71 | 45 |
| 4 | 17 | 0.4 | 0.2 | " | 74 | 26 |
| 5 | 30 | 0.2 | 0.2 | " | 75 | 32 |
| Comparative example 1 | 10 | 1.0 | 0.2 | " | 70 | 17 |
| 2 | 60 | 8.2 | 0.2 | yellow | 62 | 24 |
| 3 | 6 | 19 | 0.2 | yellow | 58 | 17 |
| 4 | — | — | 0 | no coloring | 79 | 15 |
| Example 6 | 25 | 0.3 | 0.2 | " | 77 | 30 |
| 7 | 25 | 0.3 | 0.2 | " | 72 | 32 |
| 8 | 25 | 0.3 | 0.2 | " | 70 | 34 |
| 9 | 25 | 0.3 | 0.2 | " | 75 | 32 |

We claim:

1. A stabilized halogen-containing resin composition wherein (a) 0.01 to 10 weight parts of a hydrotalcite, (b) 0.01 to 5 weight parts of at least one zinc compound selected from the group consisting of an organic carboxylic acid zinc salt, zinc oxide, a basic carbonate salt and zinc carbonate, (c) 0.01 to 5 weight parts of magnesium hydroxide having an average secondary grain size of 2 μm or less and a specific surface area of 15 m²/g or more, and (d) 0.01 to 5 weight parts of a β-diketone compound and/or a phosphite compound selected from the group consisting of a bisphenol A tetra $C_{12-15}$ alkyl diphosphite, triisodecyl phosphite or phenyl diisodecyl phosphite are compounded into a halogen-containing resin per 100 weight parts thereof.

2. The resin composition of claim 1 wherein (a) 0.1 to 10 weight parts of a hydrotalcite, (b) 0.05 to 1 weight parts of said zinc compound, (c) 0.05 to 1 weight parts of said magnesium hydroxide, and (d) 0.05 to 1 weight parts of a β-diketone compound and/or said phosphite compound are compounded into a halogen-containing resin per 100 weight parts thereof.

3. The resin composition of claim 1 or 2 wherein the halogen-containing resin is at least one polymer selected from the group consisiting of a vinyl chloride polymer, a vinyl chloride/vinyl acetate copolymer, a vinylidene chloride copolymer, a post-chlorinated vinyl chloride polymer, chlorinated polyethylene and chlorinated polypropylene.

4. The resin composition of claim 1 or 2 wherein the hydrotalcite is represented by the following general formula (1)

$$M_{1-x}^{+2}Al_x(OH)_2 A_{x/n}^{n-} \cdot mH_2O \qquad (1)$$

wherein $M^{+2}$ is Mg or a mixture of Mg and Zn, $A^{n-}$ represents one or more of n valent anions, x is a positive number satisfying $0.2 \leq x < 0.5$, and m is a positive number satisfying $0 < m < 1$.

5. The resin composition of claim 4 wherein the hydrotalcite is one obtained by substantially removing the crystallition water by heating a hydrotalcite represented by the above general formula (1) at a temperature of 200° to 300° C.

6. The resin composition of claim 1 or 2 wherein the β-diketone compound is stearoylbenzoylmethane.

7. A molding article from the resin composition of claim 1 or 2.

* * * * *